United States Patent Office 3,466,270
Patented Sept. 9, 1969

3,466,270
HYDROPYRIDINES, TRIORGANOSILYL HYDROPYRIDINES, AND PROCESS FOR THEIR PREPARATION
Newell C. Cook, Schenectady, N.Y., assignor to General Electric Company, a corporation of New York
No Drawing. Filed May 27, 1965, Ser. No. 459,463
Int. Cl. C08f 5/00; C07f 7/10
U.S. Cl. 260—88.3                                   18 Claims

ABSTRACT OF THE DISCLOSURE

Triorganosilyl pyridine compounds are produced by reacting an organosilicon compound containing silanic hydrogen with a pyridine compound in the presence of a Group VIII metal. These triorganosilyl pyridine compounds are useful in the preparation of dihydropyridines which can be polymerized to yield polymers useful as molding compounds and as insulating materials. The triorganosilylated pyridines themselves are useful as oxidation inhibitors and as ultraviolet light absorbers for various polymers.

This invention is concerned with making hydropyridine compounds from pyridine compounds. More particularly, the invention is concerned with a process for making hydropyridines containing at least one carbon atom in the ring substituted with two hydrogen atoms thereon, which process comprises effecting reaction, in the presence of a metal selected from the class consisting of palladium, rhodium, nickel, platinum, iridium and ruthenium, between a pyridine compound and an organosilicon composition containing silanic hydrogen (—SiH), for example, organopolysiloxanes containing silanic hydrogen, a triorganosilane of the formula R$_3$SiH, etc., where R is, e.g., a member of the class consisting of organoxy radicals, monovalent hydrocarbon radicals, etc., to form, for instance, an organosilicon derivative of the pyridine compound, and, if desired, thereafter removing the organosilyl group to obtain the hydropyridine compound. The invention also includes compositions derived from the above process.

The term "pyridine compound" is intended to mean and include compounds containing the backbone structure

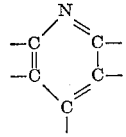

for example, pyridine, quinoline, acridine, alkyl-substituted derivatives of pyridine, quinoline, acridine, etc.

The term "hydropyridine" is intended to mean any derivative of pyridine coming within the scope of the above-defined pyridine compound in which at least one carbon atom in the ring is substituted with two hydrogen atoms, thereby interrupting the wholly aromatic characteristic of the pyridine compound.

For purposes of reference and brevity, the organic compound containing silanic hydrogen will hereinafter be referred to as the "SiH compound" and is intended to include both monomeric silanes and organopolysiloxanes containing silanic hydrogen.

Many attempts have been made in the past to make hydropyridines and particularly to make dihydropyridines, for instance, 1,4-dihydropyridine having the formula I
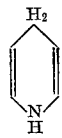

In most instances, the route for making hydropyridines is quite complex and involves difficult processing techniques. In addition, to the best of my knowledge, no one has reported the preparation of the unsubstituted dihydropyridine of Formula I.

Unexpectedly, I have discovered that I am able to make hydropyridines from a pyridine compound by a method which proceeds at relatively low temperatures employing reactants which are readily available. The hydropyridines produced are readily separable and have many uses as intermediates in the preparation of other compounds or even as monomers for polymeric preparations. By reaction with suitable reagents, these hydropyridines can be converted to even more complex type compositions which ordinarily can be prepared only by complex procedures.

In accordance with my invention, I prepare a hydropyridine from a pyridine compound by effecting reaction between a SiH compound and a pyridine compound in the presence of a certain class of metals which are the effective catalysts including palladium, rhodium, nickel, platinum, iridium and ruthenium. These metals, particularly the noble metals, can be employed either in a finely divided state or else they can be employed as deposited coatings on inert substrates such as charcoal, graphite, aluminum oxide, etc. When employing the nickel, the latter is advantageously used as a Raney nickel whose preparation is well known in the art to yield the finely divided nickel having large surface area. The amount of catalyst metal is not critical.

The reaction between the pyridine compound and the SiH compound is carried out under substantially anhydrous conditions in order to obtain optimum yield and utilization of the reactants. The use of inert atmospheres such as nitrogen, helium, etc., during the reaction is especially advantageous. Generally, it is only necessary to combine with stirring the SiH compound with the pyridine compound in the presence of the finely divided metal catalyst. It is important when mixing the SiH compound with the pyridine compound to employ adequate and usually vigorous stirring.

Generally, the reaction proceeds at relatively low temperatures of the order of about −10 to 10° C., and usually proceeds quite adequately at room temperature (25–30° C.). However, slight heating of the reaction mixture to temperatures as high as 100–125° C. or even higher materially accelerates the reaction but leads in some instances to problems of controlling the reaction. Accordingly, one of the preferred embodiments of carrying out the reaction involves merely effecting reaction between the ingredients in the presence of the metal catalyst at room temperature taking advantage of the exothermic characteristics of the reaction for any desired increase in temperature. Often the temperature rise due to the exotherm may be sufficiently great to warrant the use of cooling means such as an ice bath. The reaction between the ingredients can be maintained for a time ranging from about a few minutes to as long as a number of hours or several days. Supra-atmospheric as well as atmospheric pressures may be employed. Generally the reaction is continued out until completion of the reaction and attainment of the desired product is evident. The silylated pyridine compounds, i.e., those which contain the organosilicon group derived from the SiH compound can then be isolated by usual means such as fractional distillation, crystallization, etc.

Taking as an example the reaction of a triorganosilane with a pyridine compound, once the triorganosilyl derivative of the hydropyridine is obtained, the triorganosilyl group can be removed by various means such as by reaction with methanol (to form trimethylmethoxysilane and the hydropyridine), water (to form trimethylsilanol and the hydropyridine), ammonia (to form in addition to the hydropyridine, trimethylsilylamine), phosphines (to form as a by-product, triphenylsilylphosphine), etc. The reaction of the triorganosilylated hydropyridine with an active halide, such as acetyl chloride, can be used to make the acetylated derivative with the by-product being the triorganosilyl halide.

The SiH compound employed in the practice of this invention can be either a monomeric silane or a polysiloxane containing silanic hydrogen. The compound can have one silicon-bonded hydrogen per molecule or any number of silicon-bonded hydrogen atoms per molecule. Furthermore the physical nature of the SiH reactant is not critical. Thus, the organosilicon compound can be a silane of the formula $RSiH_3$, $R_2SiH_2$ and $R_3SiH$; siloxanes having the unit formulae RHSiO, $R_2HSiO_{1/2}$ or $RH_2SiO_{1/2}$; or siloxane copolymers in which one or more of the silicon atoms have silicon-bonded hydrogen attached thereto in which copolymers of the various siloxane units can be, for example, of the formulae $HSiO_{1.5}$, $H_2SiO$, RHSiO, $RH_2SiO_{0.5}$, $RSiO_{1.5}$, $R_2SiO$ and $R_3SiO_{0.5}$. The SiH compound should have an average of at least 0.5, and preferably at least one R group attached to silicon by silicon-carbon linkage per silicon atom, any other remaining valences of said compound, other than hydrogen or R groups, being oxygen atoms of a SiOSi linkage.

Among the radicals which R may be are, for instance, alkyl radicals (e.g., methyl, ethyl, propyl, isopropyl, butyl, hexyl, etc.); aryl radicals (e.g., phenyl, diphenyl, naphthyl, etc.); aralkyl radicals (e.g., benzyl, phenylethyl, etc.); alkaryl radicals (e.g., tolyl, xylyl, ethylphenyl, etc.); alkenyl radicals (e.g., vinyl, allyl, methallyl, etc.); organoxy radicals (e.g., methoxy, ethoxy, propoxy, phenoxy, benzyloxy, tolyloxy, naphthoxy, etc.); etc. The R radicals of the SiH compound, e.g., the triorganosilane, may be the same or different, and may have inert substituents thereon, e.g., halogens, organoxy radicals, etc.

Among the organosilanes which may be used are, for instance, methylsilane, dimethylsilane, trimethylsilane, triethylsilane, dipropylsilane, tributylsilane, triphenylsilane, methyl phenylsilane, tribenzylsilane, triallylsilane, dimethylethylsilane, dimethylphenylsilane, triethoxysilane, dimethylmethoxysilane, methoxy-dimethylsilane, phenoxy-dimethylsilane, trimethoxysilane, triphenoxysilane, etc.

Among the pyridine compounds which may be employed in addition to pyridine, quinoline, and acridine, are hydrocarbon-substituted pyridines, hydrocarbon-substituted quinolines, and hydrocarbon-substituted acridines, where the hydrocarbon substituent groups have the same meanings as R defined above. Among the hydrocarbon-substituted compounds which may be employed for reaction with the SiH compound may be mentioned, for instance, beta-phenylpyridine, alpha-vinylpyridine, various picolines (e.g., alpha-methylpyridine, beta-methylpyridine, etc.); the collidines including 4-ethyl-2-methylpyridine, 2,4,6-trimethylpyridine, beta-collidine, etc.; the lutidines (e.g., 2,6-lutidine, 2,4-lutidine, etc.); dimethylquinoline, quinaldine, benzoquinoline, etc.; methylacridine, ethylacridine, etc. The presence of inert substituents, e.g., halogens, etc., on the hydrocarbon radical and on the carbon positions of the pyridine ring is not precluded.

In order that those skilled in the art may better understand how the present invention may be practiced, the following examples are given by way of illustration and not by way of limitation.

The palladium catalyst used in the following examples was in the form of finely divided (from 200 to 400 mesh) palladium deposited on charcoal wherein the palladium comprised about 10%, by weight, of the total weight of the catalyst material. Where analytical results are given in the following examples, the values in parentheses are the theoretical values for the element. In all the following examples, the reactants were combined and reaction was carried out in an inert atmosphere, for example, under helium or nitrogen, and under anhydrous conditions. Distillations and other isolations of compounds were also carried out under the same conditions, and many of the isolated products were stored in moisture-free containers to avoid undesirable change in composition due to hydrolysis.

Example 1

To a reaction vessel equipped with a stirrer, thermometer, gas inlet tube, and Dry Ice condenser were charged 400 grams of dry pyridine and 8 grams of dry palladium catalyst. About 148 grams trimethylsilane was added through an inlet tube to the stirred suspension of pyridine and palladium catalyst over a 2 hour period during which time the temperature rose to about 42° C. After stirring at room temperature under nitrogen for about 48 hours, the mixture was filtered free of catalyst and then distilled at reduced pressure under anhydrous conditions. The residue which remained after distillation was purified by recrystallization from benzene to yield N,N'-bistrimethylsilyl-1,1'-dihydro-4,4'-bipyridine melting at 165–167° C. and having the formula

II

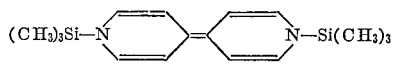

Analysis showed the compound to contain: C, 63.8% (63.6%); H, 8.7% (8.6%); N, 9.0% (9.2%); Si, 18.5% (18.5%). The distillate when subjected to partial fractional distillation through a spinning band column comprised six compounds which are recited in Table I below. Table II gives the boiling point and analytical results on these various compounds.

TABLE I

| Compound: | Name |
|---|---|
| A | 1-trimethylsilyl-1,2,3,6-tetrahydropyridine. |
| B | 1-trimethylsilyl-1,2,3,4-tetrahydropyridine. |
| C | 1-trimethylsilyl-1,2-dihydropyridine. |
| D | 1-trimethylsilyl-1,4-dihydropyridine. |
| E | 1,5-(di-trimethylsilyl)-1,2,3,4-tetrahydropyridine. |
| F | 1,5-(di-trimethylsilyl)-1,2-dihydropyridine. |

TABLE II

| Compound | Percent C | Percent H | Percent N | Percent Si | $n_D^{25}$ | B.P., °C. |
|---|---|---|---|---|---|---|
| A | 61.7(62.0) | 10.9(10.9) | 9.1(9.1) | 18.3(18.1) | 1.4527 | 43°/7 mm. |
| B | 61.8(62.0) | 10.9(10.9) | 9.2(9.1) | 18.3(18.1) | 1.4568 | 49°/7 mm. |
| C | 62.7(62.8) | 10.0(9.8) | 9.2(9.2) |  | 1.4852 | 53°/7 mm. |
| D | 62.8(62.8) | 10.0(9.8) | 9.1(9.2) | 18.2(18.3) | 1.4834 | 57°/7 mm. |
| E | 58.5(58.2) | 11.1(11.0) | 6.4(6.2) | 25.5(24.7) | 1.4714 | 70°/2.5 mm. |
| F | 59.5(58.7) | 10.2(10.2) | 6.6(6.2) | 25.0(24.8) | 1.4772 | 72°/2.5 mm. |

Further identification of the compounds was made by NMR spectra, infrared, and ultraviolet spectra. Hydrogenation of compounds B and D with palladium catalyst on charcoal equal in weight to that of the compound being hydrogenated gave 1-trimethylsilyl piperidine.

Example 2

In this example, Example 1 was repeated except that the temperatures at which the reactions were conducted were varied. In one case, the temperature was not allowed to rise above 30° C. and in another case the temperature was maintained around 0° C. In another instance, the temperature was allowed to rise to about 80° C. and the reaction was then continued at a temperature of around 60–65° C. The following Table III shows the temperatures of the different reactions and the times at which the reactions were conducted. In each instance, the same compounds were obtained as in Example 1.

TABLE III

| Test No. | Temp. (° C.) | Time |
|---|---|---|
| 1 | 30 | 24 hours. |
| 2 | 0 | 11 days. |
| 3 | 60–65 | 4 hours. |

Example 3

This example illustrates the use of other finely divided metal catalysts useful in the reaction of pyridine with trimethylsilane. More particularly, into each of six reaction vessels equipped with stirrer, gas inlet, Dry Ice condenser and thermometer were added 50 cc. of dry pyridine and the particular catalyst and amount of catalyst as shown in Table IV below. About 9 grams trimethylsilane was introduced into each of the reaction vessels over a period of 11–13 minutes at room temperature (about 27° C.) and the course of the reaction was then followed by vapor phase chromatography to determine the extent of reaction and the compounds formed. In each instance, with the exception of the rhodium catalyst, products obtained with the palladium catalyst of Example 1 were present. The rhodium catalyst gave only the 1-trimethylsilyl-1,4-dihydropyridine.

TABLE IV

| Catalyst: | Weight in reaction mixtures (grams) |
|---|---|
| 5% rhodium on carbon | 0.5 |
| PdCl$_2$ | 0.5 |
| NiRaney | 0.1 |
| 5% platinum on carbon | 0.5 |
| 5% ruthenium | 0.5 |

Example 5

This example illustrates triorganosilylation of 3-picoline. More particularly, to a reaction vessel equipped with stirrer, thermometer, inlet tube and a Dry Ice condenser were charged 40 cc. of dry 3-picoline and 0.5 gram of dry palladium catalyst (10% on carbon). About 10 grams trimethylsilane was added to the stirred suspension over a 40-minute period, the temperature rising to a maximum of 32° C. and then dropping to about 24° C. The reaction mixture was then stirred at 24° C. for about 18 hours under dry nitrogen. The unreacted 3-picoline was removed by distillation under reduced pressure and the residue was then treated to isolate 1-trimethylsilyl-3-methyl-1,4-dihydropyridine boiling at 68° C./4mm.; 1-trimethylsilyl-3-methyl-1,2-dihydropyridine boiling at 70° C./6.1 mm.; and 1-trimethylsilyl-3-methyl-1,6-dihydropyridine boiling at 70° C./6.1 mm. Elemental analysis of these compounds established that these materials were in fact obtained. When the reaction was carried out at 40° C. for 20 hours, only 1-trimethylsilyl-3-methyl-1,4-dihydropyridine in over 90% yield was obtained due to isomerization.

Example 6

When 4-picoline was reacted with trimethylsilane in the same manner as in Example 5 using the same palladium catalyst and stirring the reaction mixture at 24° C. for 5 days, there was thus obtained 1-trimethylsilyl-4-methyl-1,4-dihydropyridine boiling at 202° C./1 atmosphere; 1-trimethylsilyl-4-methyl-1,2-dihydropyridine boiling at 200° C./1 atmosphere; 1-trimethylsilyl-4-methyl-1,2,3,4-tetrahydropyridine boiling at 195° C./1 atmosphere; and 4-trimethylsilylmethylpyridine (which results from the formation of 1-trimethylsilyl-4-methylene-1,4-dihydropyridine and subsequent rearrangement of the latter) boiling at 211° C./1 atmosphere. Elemental analysis of these compounds established beyond a doubt that these compounds had been obtained. It is of interest to note that when 2-picoline was substituted for the 4-picoline and the reaction mixture heated at about 50° C. for 2 days similarly as in Example 5, the rate of reaction was much lower. By raising the reaction temperature, the rate of reaction is improved and one can obtain products from 2-picoline similar to those from 3- and 4-picoline.

Example 7

The removal of triorganosilyl groups from silylated hydropyridines to yield the respective hydropyridine is shown as follows. About 5 ml. of 1-trimethylsilyl-4-hydropyridine was treated with 1.25 ml. of methanol containing 0.1% KOH and the product was thereafter separated into fractions by vacuum transfer at -20 to +30° C. The distillates collected in an inert atmosphere and under anhydrous conditions in the liquid nitrogen cooled traps revealed the presence of methoxytrimethylsilane, hexamethyldisiloxane, pyridine, and 1,4-dihydropyridine. Analysis of the 1,4-dihydropyridine showed it to contain: C, 73.3% (74.1%), H, 8.4% (8.6%), N, 16.7% (17.3%). The infra-red absorptions (in cm.$^{-1}$) occurred at 3420 and 3450 (N—H stretching); 3060 (=C—H stretching); 2920 and 2822 (CH$_2$ stretching); and at 1680 and 1640 (C=C stretching). Ultraviolet light maximum occurred at 278 millimicrons.

These dihydropyridines undergo various reactions. For example, 1,4-dihydropyridine undergoes the following polymerization reactions:

Vinyl polymerization

N—H addition

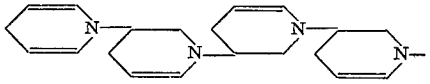

Crosslinking can occur through the remaining unsaturation or through N—H reactions in the above two mechanisms. It should be recognized that it would also be possible to polymerize the triorganosilylated hydropyridines in the same manner as the unsilylated hydropyridines except for the N—H addition reaction. At temperatures of about 25–30 C., 1,4-dihydropyridine, even in an inert atmosphere, underwent spontaneous polymerization in a few minutes to give a polymer of about 5000 molecular weight when measured in benzene; heating at elevated temperatures of 100° to 200° C. caused the formation of a still higher molecular weight, insoluble product. Polymers of molecular weight ranging from 1000 to 1,000,000 or more are possible by my process. These polymers are useful as molding compounds and as insulating materials for electrical conductors.

Triorganosilylated pyridines in which the nitrogen atom has the triorganosilyl group thereon can be used per se as oxidation inhibitors for various polymers and as ultraviolet light absorbers in those polymers where ultraviolet light tends to have a deleterious effect. Because of the fact that these silylated hydropyridines undergo many reactions with, for instance, aldehydes, ketones, etc., this makes possible the preparation of novel compositions useful in making intermediates for specialty chemicals as pharmaceuticals and as monomers for polymers. For example, reaction of 1-trimethylsilyl-4-hydropyridine with formaldehyde, benzaldehyde and acetone, gives respectively, the following compounds:

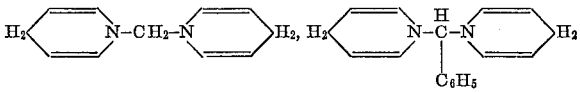

and

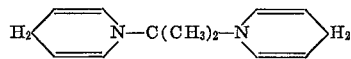

One of the important uses to which this invention may be applied is in the preparation of intermediates which can be used for room temperature vulcanizing organopolysiloxane compositions. Thus, one can effect reaction, for instance, between a SiH compound of the generic formula III 
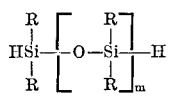

and a pyridine compound to effect substitution of the silanic hydrogen with the pyridine radical, where R has the meaning given previously, and $m$ is a whole number equal to from 1 to 100 or more. As a specific illustration, one can effect reaction between a polydimethylsiloxane of the formula V 
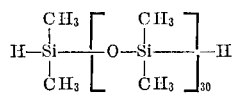

with pyridine to obtain a reaction product having the formula

V 
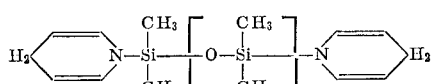

By exposure of the hydropyridine-terminated polysiloxane to an oxygen-containing atmosphere, such as air or oxygen, the dihydropyridine portion is removed to yield pyridine and a hydroxy-terminated polydimethylsiloxane which can then be condensed with metallo-organic salts and an alkyl silicate to form a room temperature vulcanizing product similar to those described in U.S. Patent 2,843,555, Berridge assigned to the assignee of the present invention.

It will of course be apparent to those skilled in the art that in addition to the SiH compounds and pyridine compounds which have been employed in the foregoing examples (including the use of an SiH compound in which silanic hydrogen is attached to an organopolysiloxane linkage), other SiH compounds and pyridine compounds, many examples of which have been given above, may be employed without departing from the scope of the invention, and there is no intent to be limited in any way to the particular compounds employed previously. The catalyst used may be varied widely within the scope of those specifically recited above.

The conditions for reaction may be varied within wide ranges and no intent is to be read into the examples of any limitation as to these conditions as, for instance, temperature, time, molar concentrations of the reactants, etc. Generally, as far as the reactants are concerned, for each molar equivalent of silanic hydrogen, one can employ one mol of the pyridine compound. However, it should be recognized that if there is more than one silanic hydrogen in the SiH compound being reacted with the pyridine compound, and it is desired to leave intact one or more silanic hydrogens, the molar equivalents of the pyridine compound will obviously be less than the number of silanic hydrogens. In general the molar concentrations of the SiH compound may be greater or less than the mols of the pyridine compound. Advantageously, I have found that a molar excess (up to 10 or more mols) of the pyridine compound per mol silanic hydrogen can be used, employing the excess pyridine or pyridine compound as a solvent for the reaction and the reaction products.

In addition to my process being adaptable for reacting SiH compounds with pyridine compounds containing a single nitrogen, it will be apparent to those skilled in the art that these SiH compounds can also be reacted with compounds such as oxazole, isoxazole, etc., and with cyclic compounds containing more than one nitrogen in the ring containing aromatic unsaturation in which nitrogen participates in the aromatic unsaturation. These include all the isomeric forms of diazine and triazine, etc., as well as the many substituted diazines, triazines, etc.

What I claim as new and desire to secure by Letters Patent of the United States is:

1. A composition of matter selected from the class consisting of N,N'-bistrimethylsilyl-1,1'-dihydro-4,4'-bipyridine, triorganosilyl-substituted dihydropyridines, triorganosilyl - substituted lower alkyl-substituted dihydropyridines, triorganosilyl-substituted tetrahydropyridines contaning a carbon to carbon double bond in the pyridine ring, and triorganosilyl-substituted lower alkyl- substituted tetrahydropyridines containing a carbon to carbon double bond in the pyridine ring, wherein the triorganosilyl group is attached directly to the nitrogen atom of the pyridine ring, the organo group of the triorganosilyl radicals being selected from the class consisting of alkyl groups containing up to six carbon atoms, aryl groups containing up to twelve carbon atoms, aralkyl groups containing up to eight carbon atoms, and alkaryl groups containing up to eight carbon atoms.
2. 1-trimethylsilyl-1,,2,3,6-tetrahydropyridine.
3. 1-trimethylsilyl-1,2,3,4-tetrahydropyridine.
4. 1-trimethylsilyl-1,2-dihydropyridine.
5. 1-trimethylsilyl-1,4-dihydropyridine.
6. 1,5-(di-trimethylsilyl) 1,2,3,4-tetrahydropyridine.
7. 1,5-(di-trimethylsilyl)-1,2-dihydropyridine.
8. 1-trimethylsilyl-3-methyl-1,4-dihydropyridine.
9. 1-trimethylsilyl-3-methyl-1,2-dihydropyridine.
10. 1-trimethylsilyl-3-methyl-1,6-dihydropyridine.
11. The compound 1,4-dihydropyridine.
12. A polymer of 1,4-dihydropyridine selected from the class consisting of polymers having the repeating unit

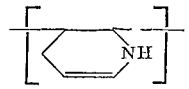

or

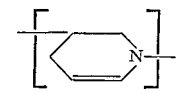

said polymers having a molecular weight of from 1000 to 1,000,000

13. A trimethylsilyl substituted composition having the formula

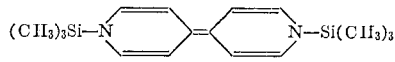

14. The process for making a triorganosilyl-substituted hydropyridine compound containing from 1 to 2 carbon double bonds in the pyridine ring wherein the triorganosilyl group is attached directly to the nitrogen atom of the pyridine ring, which process comprises effecting reaction, in the presence of a metal selected from a class consisting of palladium, rhodium, nickel, platinum, iridium and ruthenium between (1) a member of the class consisting of pyridine, lower alkylpyridines, quinoline, lower alkyl-substituted quinolines, acridine, and lower alkyl-substtiuted acridines and (2) an organosilicon compound selected from the class consisting of $R_3Si$ $H_3, R_2SI$ $H_2$ and $R_3Si$ H, wherein R is selected from the class consisting of alkyl groups containing up to six carbon atoms, aryl groups contaiinng up to twelve carbon atoms, aralkyl groups containing up to eight carbon atoms, and alkaryl groups containing up to eight carbon atoms, thereby to form the corresponding triorganosilyl derivative.

15. The process as in claim 14 wherein the triorganosilyl containing product is treated with a member of the class consisting of methanol, water, ammonia and triphenylphosphine to remove the triorganosilyl group and to obtain the corresponding de-silylated hydropyridine compound containing from one to two carbon to carbon double bonds in the ring.

16. The process which comprises effecting reaction between (1) a triorganosilane having the formula $R_3SiH$ wherein R is a member of the class consisting of alkyl groups containing up to 6 carbon atoms inclusive, aryl groups containing up to 8 carbon atoms inclusive, aralkyl groups containing up to 8 carbon atoms, alkaryl groups containing up to 8 carbon atoms, alkenyl groups containing up to 4 carbon atoms inclusive, lower alkoxy groups and aryloxy groups containing up to 8 carbon atoms and (2) pyridine by mixing in the presence of palladium thereby to obtain a triorganosilyl derivative of a dihydropyridine compound.

17. The process which comprises effecting reaction between (1) a triorganosilane having the formula $R_3SiH$ wherein R is a member of the class consisting of alkyl groups containing up to 6 carbon atoms inclusive, aryl groups containing up to 8 carbon atoms inclusive, aralkyl groups containing up to 8 carbon atoms, alkaryl groups containing up to 8 carbon atoms, alkenyl groups containing up to 4 carbon atoms inclusive, lower alkoxy groups and aryloxy groups containing up to eight carbon atoms, and (2) 3-picoline by mixing in the presence of palladium to obtain a triorganosilyl derivative of the 3-picoline.

18. The process which comprises effecting reaction between (1) a triorganosilane having the formula $R_3SiH$ wherein R is a member of the class consisting of alkyl groups containing up to 6 carbon atoms inclusive, aryl groups containing up to 8 carbon atoms inclusive, aralkyl groups containing up to 8 carbon atoms, alkaryl groups containing up to 8 carbon atoms, alkenyl groups containing up to 4 carbon atoms inclusive, lower alkoxy groups and aryloxy groups containing up to 8 carbon atoms and (2) 4-picoline by mixing in the presence of palladium to obtain a triorganosilyl derivative of the 4-picoline.

References Cited

Wittenberg, et al.: C.A. 52:16347 (1958).

Klingsberg: Pyridine and its Derivatives, Part I (Interscience, N.Y., (1960) page 77.

HENRY R. JILES, Primary Examiner

C. M. SHURKO, Assistant Examiner

U.S. Cl. X.R.

252—63.7, 401, 472; 260—18, 46.5, 248, 250, 251, 279, 283, 289, 290, 293.2, 296, 297, 307, 448.2, 448.8, 824